(No Model.) 2 Sheets—Sheet 2.
W. C. OSWALD.
VEHICLE TONGUE.
No. 467,622. Patented Jan. 26, 1892.
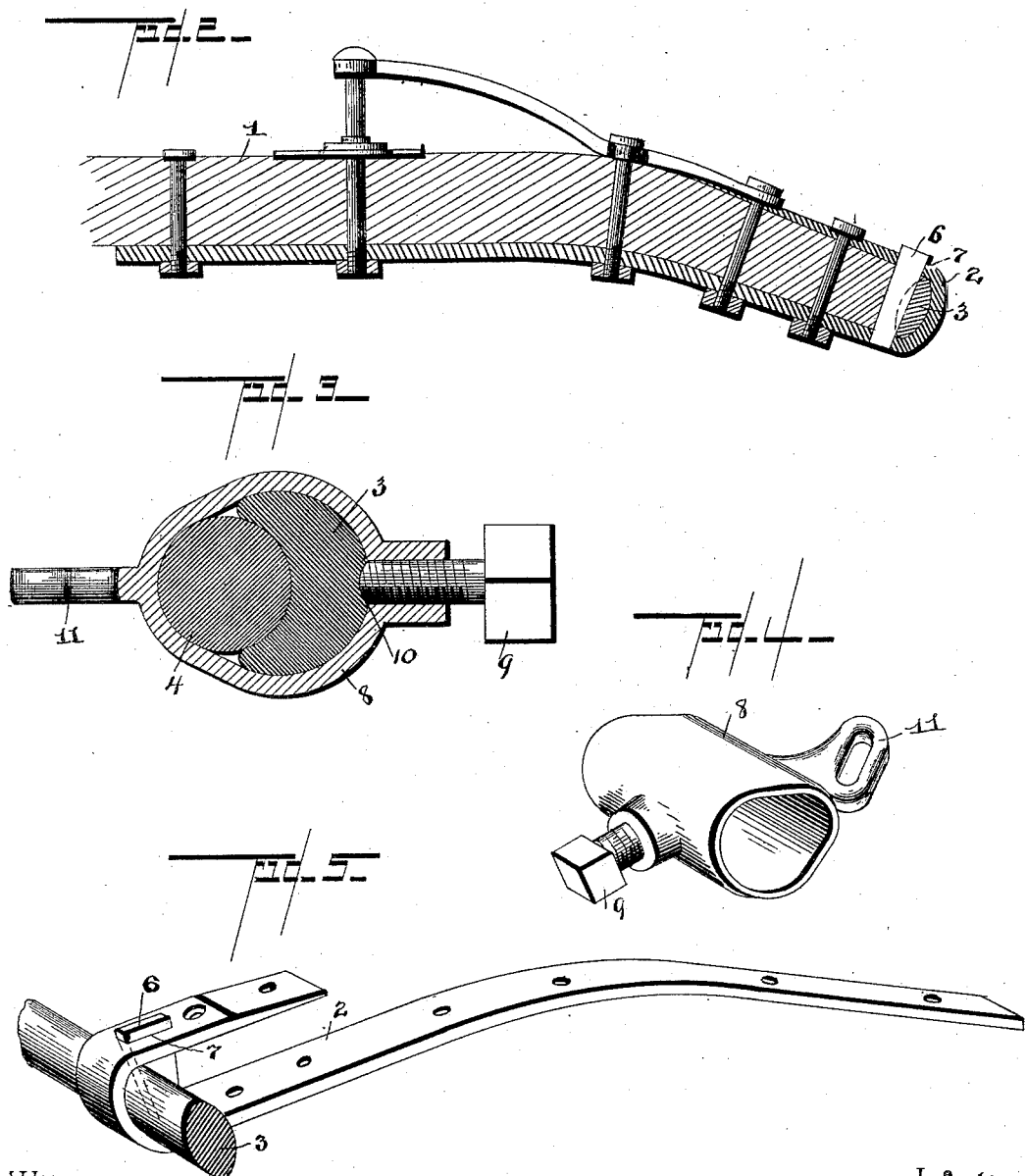
Witnesses
H. G. Seitz
H. J. Riley
Inventor
William C. Oswald
By his Attorneys,
C. A. Snow & Co.

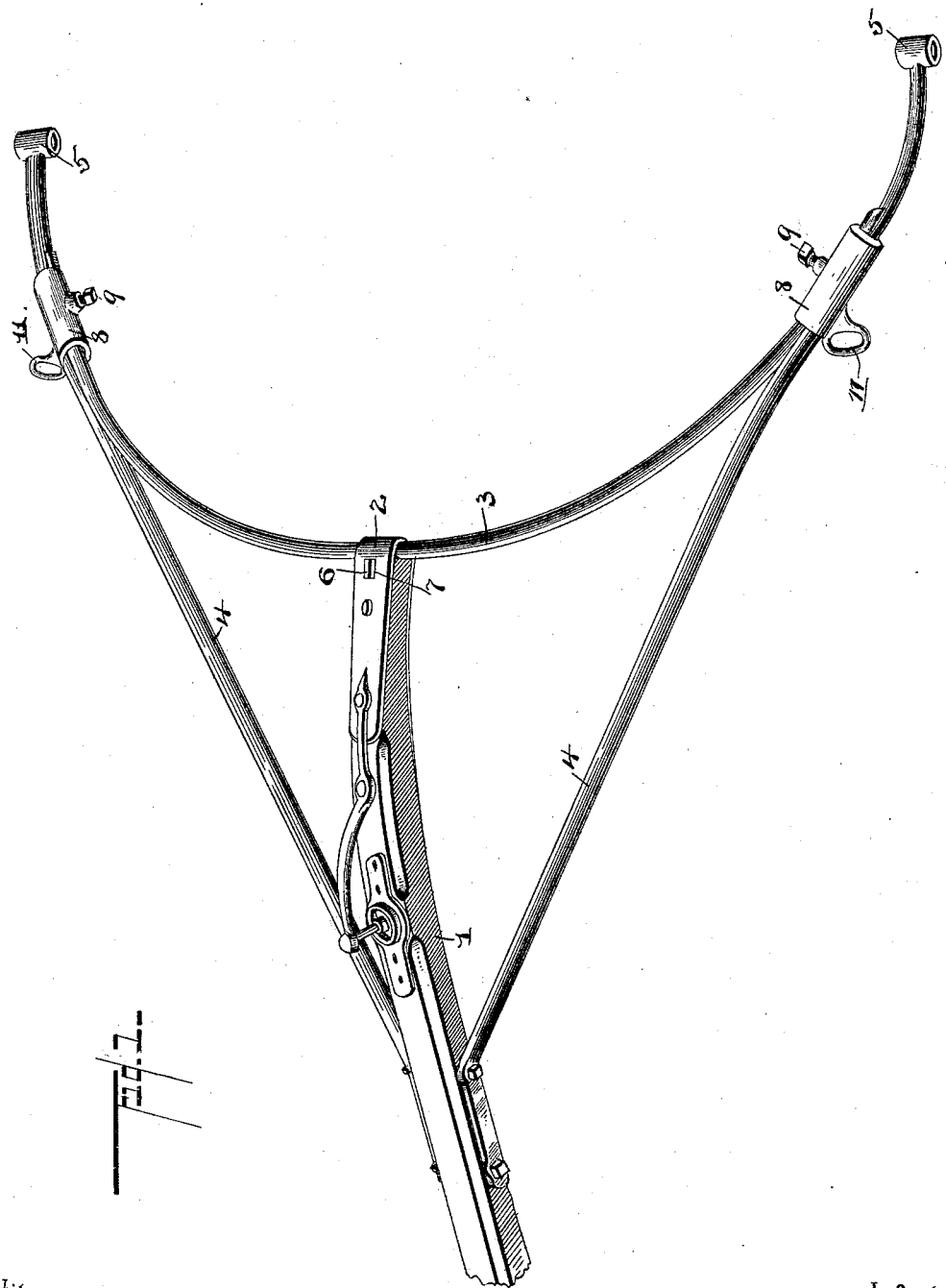

UNITED STATES PATENT OFFICE.

WILLIAM C. OSWALD, OF ROCK ISLAND, ILLINOIS.

VEHICLE-TONGUE.

SPECIFICATION forming part of Letters Patent No. 467,622, dated January 26, 1892.

Application filed October 6, 1891. Serial No. 407,891. (No model.)

*To all whom it may concern:*

Be it known that I, WILLIAM C. OSWALD, a citizen of the United States, residing at Rock Island, in the county of Rock Island and State of Illinois, have invented a new and useful Vehicle-Tongue, of which the following is a specification.

The invention relates to improvements for vehicle-tongues.

The object of the present invention is to simplify and improve the construction of vehicle-tongues and to enable the same to be readily adjusted to a vehicle having its couplings any distance apart.

The invention consists in the construction and novel combination and arrangement of parts hereinafter fully described, illustrated in the accompanying drawings, and pointed out in the claims hereto appended.

In the drawings, Figure 1 is a perspective view of a tongue constructed in accordance with this invention. Fig. 2 is a detail sectional view taken longitudinally of the tongue. Fig. 3 is a similar view taken through one of the clamping-sleeves. Fig. 4 is a detail perspective view of one of the clamping-sleeves. Fig. 5 is a similar view of the tongue-strap.

Like numerals of reference indicate corresponding parts in all the figures of the drawings.

1 designates a tongue, having secured at its rear end by a strap 2 a transverse curved bar 3, to the ends of which are secured diverging bracing-rods 4, having their front ends extending along and bolted to opposite sides of the tongue and provided at their rear ends with eyes 5, adapted for the reception of coupling-bolts. The metal strap 2 is secured to the upper and lower faces of the tongue and passes around the rear end of the same and extends beyond the tongue to provide a loop or socket for the curved bar 3, which is detachably secured to the strap by a key 6, arranged in registering openings 7 of the metal strap and engaging a recess of the curved bar 3.

The diverging bracing-rods 4, which are provided at their rear ends with eyes, are secured to the ends of the bar 3 by clamping-sleeves 8, which receive the rods and the bar, and which are provided with set-screws 9, arranged in threaded openings and engaging recesses 10 in the ends of the bar 3. By loosening the set-screws 9 the rods 4 may be readily adjusted to arrange the eyes 5 the desired distance apart, whereby the tongue is adapted to be coupled to any vehicle. The clamping-sleeves 8 are provided at their front ends with integral extensions 11, projecting outward from the rods 4 and provided with openings which form eyes adapted to receive stay or safety straps.

It will be seen that the tongue is simple and inexpensive in construction, strong and durable, and adapted to be readily adjusted to suit any vehicle.

The ends of the curved bar are concavely grooved on their outer faces to receive and conform to the sides of the rods.

What I claim is—

1. The combination of a tongue, a curved bar secured to the rear end of the same, diverging rods having their front ends secured to the tongue and their rear ends provided with eyes, and clamping-sleeves receiving the ends of the curved bar and the rods and provided with set-screws and having integral extensions projecting outward and provided with openings to form eyes, substantially as described.

2. The combination of a tongue, the metal strap secured to the upper and lower faces of the tongue and projecting rearward therefrom and provided with openings, the curved bar arranged in the extended portion of the strap and provided with a recess, a key arranged in the opening and engaging the recess, and rods having their front ends connected to the tongue and their rear ends provided with eyes and secured to the curved bar, substantially as described.

In testimony that I claim the foregoing as my own I have hereto affixed my signature in the presence of two witnesses.

WILLIAM C. OSWALD.

Witnesses:
   WM. C. THEDE,
   ALPHEUS REESER.